Sept. 6, 1955  K. RABE  2,717,173
VENTILATING STRUCTURE FOR MOTOR VEHICLE BODIES
Filed Oct. 22, 1952
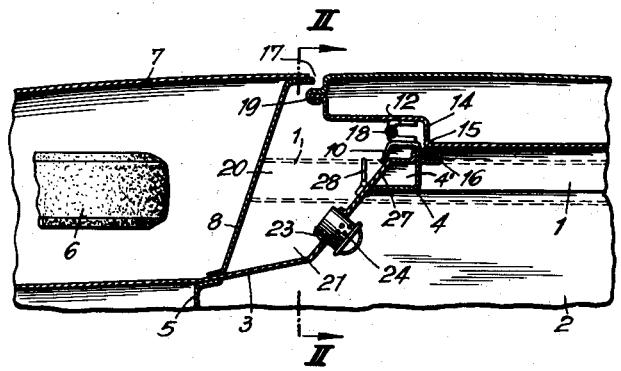
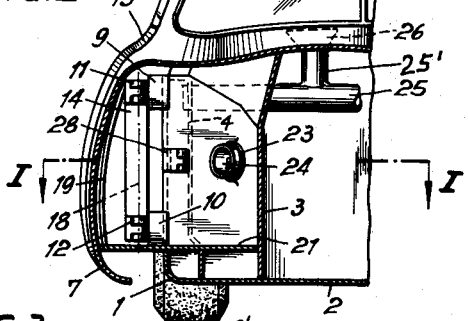
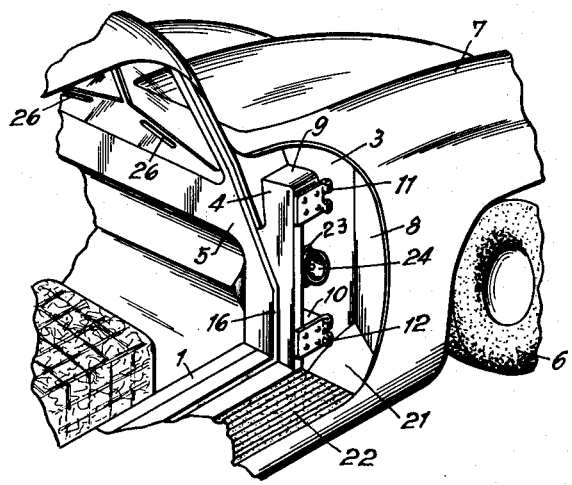
INVENTOR
Karl Rabe
By Pennie, Edmonds, Morton, Barrows and Taylor
Attorneys

United States Patent Office 2,717,173
Patented Sept. 6, 1955

2,717,173
VENTILATING STRUCTURE FOR MOTOR VEHICLE BODIES

Karl Rabe, Stuttgart, Germany, assignor to Dr. Ing. H. C. F. Porsche K.-G., Stuttgart-Zuffenhausen, Germany Application October 22, 1952, Serial No. 316,115

Claims priority, application Germany November 20, 1951

8 Claims. (Cl. 296—28)

This invention relates to improvements in ventilating arrangements for motor vehicles, more particularly for vehicles having a streamlined body.

In known arrangements and devices for ventilating motor vehicles, it has been necessary to provide many structural parts and specially built air chambers as well as duct work, all of which considerably increase the cost of the vehicle. Moreover, difficulties are encountered in locating such devices in the vehicle and in housing any special air chambers or duct work in the body or walls of the vehicle. It is also necessary to provide apertures in the body of the vehicle walls for admitting cooling air to the interior of the body, and in order to make such apertures effective, it is usually necessary that they be fitted with deflector or guide plates or similar means for scooping and guiding the air, such devices having a disturbing effect on the flow of air as it sweeps along the body of the vehicle, particularly streamlined vehicles, and they also mar the appearance of the vehicle.

In accordance with the present invention, the foregoing difficulties are overcome and avoided by making use of the door chink as an admission aperture for air used in the ventilating system of the vehicle by locating this chink in a pressure region of the flow of air around the vehicle when it is in motion. In this construction, the door chink interrupts the continuity of the outer skin of the coach work in the pressure region and supplies air into an air collecting chamber, which is sealed off from the interior of the vehicle.

In the improved body construction, the ventilating arrangement requires no special constructional parts since parts of the body structure are made use of to provide the ventilating arrangement, thereby effecting a saving in both material and labor. Furthermore, the novel arrangement of the present invention does not disfigure the body of the vehicle or interfere with the normal flow of air along its streamlined surfaces.

In a preferred construction, the pivotal axis of the door is located to the rear of the forward edge of the door forming one side of the chink through which ventilating air is supplied. In this arrangement, the forward portion of the door in front of the pivotal axis swings into a closed-off space in the body when the door is opened, such space forming the air-collecting space or chamber for ventilating air. Means is provided for conducting fresh air from the collecting space into the interior of the vehicle, such means being made adjustable for regulating the flow of air as desired.

In accordance with another feature of the invention, means is provided for mixing heated air, delivered by a heater associated with the vehicle engine, with the fresh air in the air-collecting chamber, such air to be used for heating the vehicle or for defrosting the windshield. The structure and arrangement is such that heated air alone or fresh air alone may be supplied to nozzles arranged for defrosting the windshield.

The invention includes other features and advantages which are described hereinafter in connection with the accompanying drawings which form a part of this application and which illustrate one constructional form of the invention by way of example.

Fig. 1 is a broken horizontal sectional view through that part of a motor vehicle which includes a door and illustrating a construction according to the invention taken on the line 1—1 of Fig. 2;

Fig. 2 is a vertical sectional view through the part of the motor vehicle body shown in Fig. 1 and taken on the line 2—2 of Fig. 1, and Fig. 3 is a broken perspective view taken from one side of the motor vehicle body shown in Figs. 1 and 2, with the door removed, and showing the ventilating compartment or chamber in relation to adjacent parts of the motor vehicle body.

Referring to the drawings, the frame of the vehicle body comprises hollow longitudinal side supports 1, of which only one of such supports is shown, that located on the right side of the vehicle in the direction of travel. The supports 1 are welded to a bottom plate 2, which provides a floor for the vehicle body and closes the space within the body from below. Each of the supports 1 is secured to an upwardly extending supporting plate 3, which borders and closes off a part of the front portion of the driving spaces in the vehicle body, the plate 3 extending forward inside the front wheel, and merging into and constituting a part of a hollow sheet metal vertical door post or support 4, as shown in Fig. 1, welded to the hollow support 1. The front of the driving space in the vehicle body is closed off by a dashboard 5, attached at opposite sides to the plates 3. The plates 3 and 5 are parts of a box-like front transverse structure which carries and is supported by the front axles and the front wheels 6. One of the rear wheels 6' is shown in Fig. 2.

The outer skin or sheathing 7 of the vehicle body is welded to the frame members and is illustrated as providing fenders over the front wheels 6. The frame structure includes an upright plate 8 in back of each front wheel and constituting a terminal wall for the front end of the longitudinal side support 1 to which it is welded. The inside edge of the wall 8 is welded to the plate 3 while the outside edge is welded to the sheathing 7. Stirrup members 9 and 10 are provided on the upper and lower portions of the door post 4 and carry hinges 11 and 12, respectively, supporting a door 13.

The door is shown in cross-section in Fig. 1 and includes a forward inner wall part 14, to which the hinges are attached, having an edge 15, which, when the door is closed, presses against a gasket 16 surrounding the doorway in the body of the vehicle. The outer wall of the door forms a continuation of the streamlined surface of the vehicle body. A chink or front joint 17 between the front edge of the door 13 and the outer skin 7 of the body is arranged as shown in Fig. 1, providing a chink for the inflow of air. This chink is located sufficiently forward in the body structure so that it lies in a pressure region of the flow of air around the vehicle when it is in forward motion.

Referring to Fig. 1, it will be noted that the pivotal axis 18 of the door 13 is located, in a known manner, to the rear of the front edge of the door toward the middle of the door, so that the forwardly projecting edge 19 of the door swings into a space or chamber 20 between the diverging plates 8 and 3 when the door is open. The joint or chink 17 is advantageously arranged as shown in Fig. 1 so that the projecting portion 19 overlaps in spaced relation inside the edge of the body at 17.

The chamber or space 20 is bounded laterally by the forward portion 14 of the door 13, the walls 3 and 8, and the door post 4 is closed at the top by the skin or sheathing 7 and at the bottom by a plate 21, which is attached to plates 3 and 8 inside the chamber 20 and forms a continuation of the step or running board 22. The space or chamber 20 is in communication with the fresh outside air through the chink 17 when the door is closed and the vehicle is in operation so that fresh air flows into the chamber 20 through the chink 17.

Fresh air is supplied to the interior of the vehicle from the air collecting chamber 20 through an opening 23 located in the plate wall 3 and provided with a closure flap or a valve 24 for regulating the air flow into the interior of the vehicle. Any suitable type of valve 24 may be provided for controlling the rate of inflow of air as desired.

The hollow longitudinal side supports 1 constitute tubular ducts which are connected up to an air heater associated with the vehicle engine, for example, an engine mounted in the rear end of the vehicle, for conducting heated air into the interior of the vehicle or to defrosting nozzles. The system for providing heated air for introduction to the supports 1 forms no part of the invention and is not shown. The hollow door posts 4 are respectively welded to the longitudinal side supports 1 and respectively open thereinto through an opening 4' at the bottom of the post so that heated air will flow from the tubular side supports up into the posts 4. The upper ends of the hollow posts 4 are connected by a cross tube or duct 25, provided with branch ducts 25' terminating in defrosting nozzles 26 immediately in back of the windshield of the vehicle. Heated air flows from the posts through these ducts and nozzles.

Means is provided for connecting the fresh air collecting space or chamber 20 with the hot air system. For example, the chamber 20 shown in Figs. 1 and 2 is connected with the adjacent hollow post 4 by means of an opening or passageway 27 provided with a regulating closure flap 28 by which the passageway 27 may be closed or opened to any desired extent. The opening 27 and the flap 28 provide means by which hot air supplied through the hollow side supports 1 and hollow door posts 4 can be mixed with the fresh air in the chamber 20 for heating the interior of the vehicle. The greater the amount of hot air admitted to the chamber 20, the less the amount of fresh air admitted through the chink 17. When the heated air is shut off or when the fan supplying the heating air to the hollow supports 1 is reduced in speed, fresh air may be conducted from the chamber 20 through the opening 27 into the hollow post 4 and through the duct 25 to the defrosting nozzles. Means may be provided for preventing flow of air through supports 1 toward the heater. Suitable conveniently located operating handles may be provided for the valves or flaps 24 and 28, so that the operator of the vehicle may readily adjust the condition of the atmosphere in the interior of the vehicle.

While only one side and one door of the vehicle are shown in the drawings, it is to be understood that the opposite side of the vehicle may be provided with a similar structure and arrangement of parts. It is furthermore to be understood that while the heating means for the vehicle is not shown, it may comprise any of the conventional types of heaters in which a fan is utilized for forcing air into the hollow side supports 1. Where the engine is located in the front end of the vehicle, the outlet of the heater may be connected into the respective opposite air chambers 20 for mixing heated air with fresh air to be supplied to the interior of the vehicle. Such a front heater may have an air outlet connected into the forward ends of the hollow side supports 1, in front of the door posts 4, or the heater may be directly connected for delivering its heated air into the duct 25 so that heated air may flow through the nozzles 26 and also into the hollow posts 4, through openings 27 into the chambers 20 and through the outlets 23 into the interior of the vehicle.

Where it is undesirable that the heater recirculate the air from the interior of the vehicle, such a heater may have its inlet connected directly into one or more of the fresh air chambers 20 and its outlet directly connected to the nozzles 26 and to the interior of the vehicle. As an example fresh air may be supplied through one support 1 to the heater and the heated air delivered through the other support 1 to the defrosting nozzles and through the chamber 20 to the interior of the vehicle body. Where connections are made for delivering heated air from the front end of the vehicle to the hollow side supports 1, the supports may have an outlet connection to the interior of the vehicle in front of the rear seat. Other changes and modifications in the distribution of air may be made without departing from the spirit and scope of the invention as defined by the appended claims.

What is claimed as new is:

1. A ventilating arrangement for motor vehicles of the type including a body having a door at the side, means located adjacent the forward portion of the door inside the outer skin of the body forming an air collecting chamber which is shut off from the interior of the vehicle the outer surface of said door forming substantially a continuation of the exterior surface of the body of the vehicle, said exterior surface being interrupted at the forward edge of the door by a door chink through which the air-collecting chamber communicates with the air outside the vehicle, said door chink being of sufficient width when the door is closed to permit the flow of air therethrough into said air-collecting chamber, said chink being located in a pressure region of the flow of air around the side of the vehicle when in motion and adapted to conduct air under pressure into said chamber, means for conducting air from said chamber to the interior of the vehicle to effect ventilation of the vehicle, and means for controlling the flow of air in said conducting means.

2. A ventilating arrangement as claimed in claim 1 in which the door of the vehicle has a pivotal axis displaced from the forward edge of the door toward the middle of the door, said air collecting chamber being located in front of said pivotal axis and providing a space into which the part of the door in front of the pivotal axis swings when the door is opened.

3. In a motor vehicle body construction including means for ventilating the interior of the motor vehicle, the vehicle body including a door at the side providing a door chink at the forward edge of the door which interrupts the continuity of the outer skin of the body, an air collecting chamber inside the outer skin of the body communicating with said door chink, said chamber being shut off from the interior of the vehicle, and means including a control for conducting air from said air collecting chamber to the interior of the vehicle for ventilating the same, said chink being of sufficient width when the door is closed to permit the flow of fresh air from outside the vehicle into said air collecting chamber.

4. In a motor vehicle body construction including a door at the side having an outer surface forming substantially a continuation of the exterior surface of the body of the vehicle, said exterior surface being interrupted at the forward edge of the door by a door chink between the forward edge of the door and the adjacent edge of the surface of the body, said door chink being of sufficient width when the door is closed to permit the flow of air therethrough, a door post located inwardly with respect to the exterior surface of the body of the vehicle and displaced from the forward edge of the door towards the middle of the door, means for hinging the door to said door post, an air collecting chamber located in front of said door post and into which the forward edge of the door swings when the door is opened, said chamber including walls closing the chamber off from the interior of the vehicle, means for conducting air from said chamber to the interior of the vehicle, means for conducting heated air into said chamber for mixing with fresh air supplied through the door chink, and means for controlling the flow of air from said chamber to the interior of the vehicle.

5. A motor vehicle body construction as claimed in claim 4 in which said door post is hollow and comprises means for conducting air, means including a closure interconnecting said chamber with the interior of said post, and an air duct connected into said post for conducting air therefrom to the interior of the vehicle.

6. A motor vehicle body construction as claimed in claim 5 in which the body includes a hollow tubular support arranged for conducting heated air, the lower end of said hollow post being connected to said hollow support and opening thereinto whereby heated air may be conducted from said hollow tubular support into said hollow door post.

7. A motor vehicle body construction as claimed in claim 4 in which said door post is hollow and arranged to conduct air, means including a closure means interconnecting said hollow post with said air collecting chamber, an air duct connected into the upper portion of said hollow post, and an air delivery nozzle connected into said air duct and having an outlet located in back of the windshield of the motor vehicle whereby air from said chamber may be delivered through said nozzle for defrosting the windshield.

8. In a motor vehicle body construction including a frame, said frame comprising hollow longitudinal side supports each terminating at a point in back of a front wheel of the vehicle, a terminal plate attached to the forward end of each longitudinal support, a supporting plate attached to each side support rearwardly of said terminal plate and extending inwardly and forwardly of the body of the vehicle and to which said terminal plate is attached at the rear of the front wheel of the vehicle, said supporting plate terminating in and connected to an upright tubular door post spaced rearwardly from said terminal plate, sheathing extending over the front wheel and attached to said terminal plate, a door hinged to said door post and including a portion extending forwardly of the door post and forming a chink with the body sheathing on the side surface of the motor vehicle body, the forward portion of said door being adapted to swing into the space between said terminal plate and said supporting plate when the door is opened, means closing the upper and lower portions of the space between said terminal and supporting plates thereby forming an air collecting chamber communicating with the outside through said door chink, and means including a flow control for conducting air from said chamber to the interior of the vehicle body.

References Cited in the file of this patent

UNITED STATES PATENTS

| | | |
|---|---|---|
| 2,167,664 | Matthews | Aug. 1, 1939 |
| 2,295,750 | Norris et al. | Sept. 15, 1942 |
| 2,488,471 | Kramer et al. | Nov. 15, 1949 |
| 2,532,203 | Stephenson et al. | Nov. 28, 1950 |